Aug. 19, 1941.  C. E. KERR  2,252,933
CORNHUSKER
Filed June 25, 1938
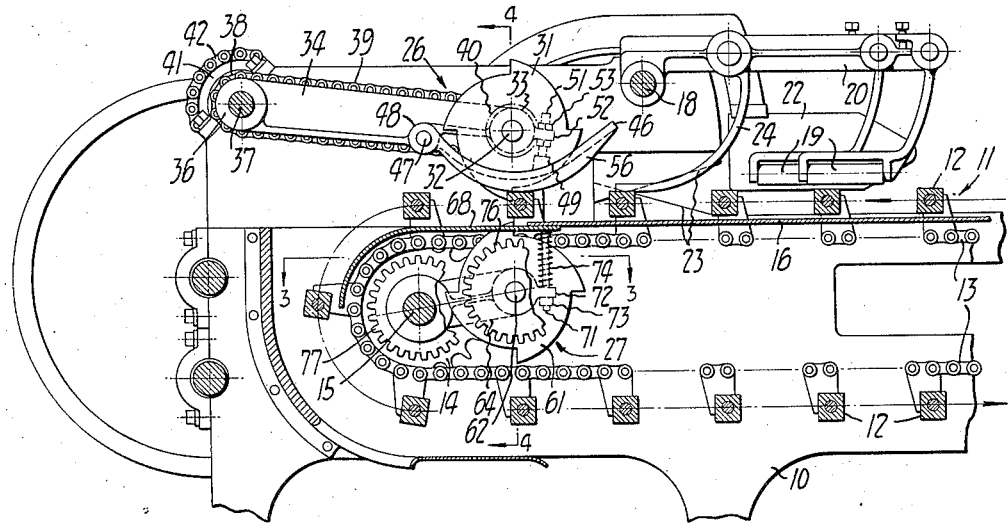
FIG_1_
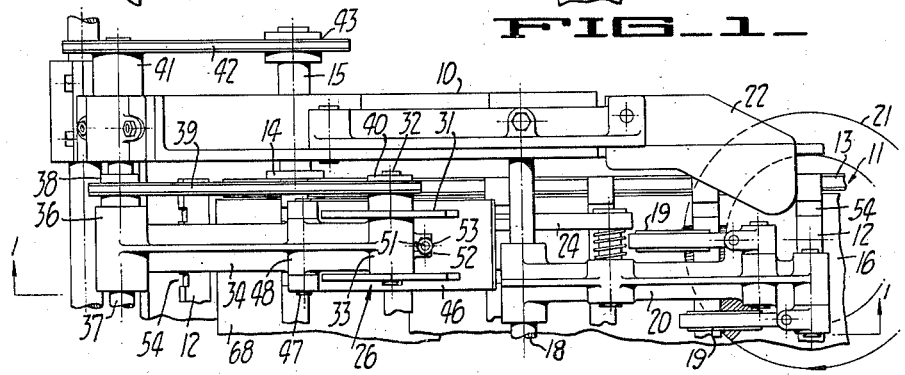
FIG_2_
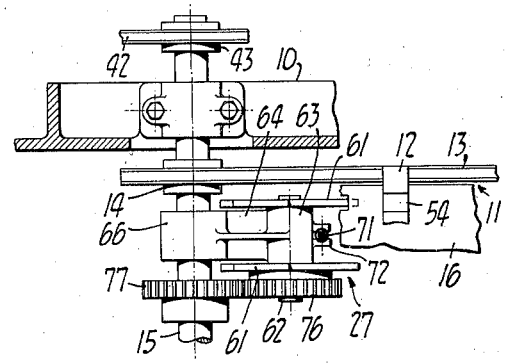
FIG_3_
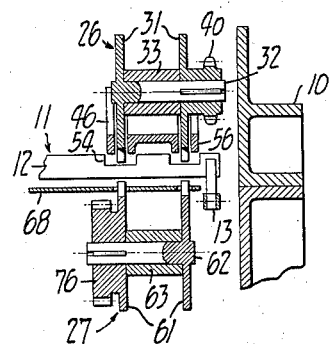
FIG_4_
INVENTOR.
Charles E. Kerr
BY Philip A. Minnis
ATTORNEY Patented Aug. 19, 1941

2,252,933

UNITED STATES PATENT OFFICE 2,252,933

CORNHUSKER

Charles E. Kerr, Hoopeston, Ill., assignor to Food Machinery Corporation, San Jose, Calif., a corporation of Delaware Application June 25, 1938, Serial No. 215,887

13 Claims. (Cl. 130—5)

My invention relates to corn huskers and is concerned more particularly with improved means for preparing the ears of corn for the husking operation by ripping or shredding the husks to provide projecting husk portions for engagement by the husking means.

The husk ripping means of the instant invention is designed to provide for effective ripping and shredding of the husks by operation of husk ripping discs which are preferably made self-cleaning to enable effective operation over a long period of use without such fouling or clogging.

It is a general object of the invention, therefore, to provide a corn husker having improved means for preparing the corn for the husking operation.

Another object of the invention is to provide a corn husker having improved husk ripping means which remain clean and effective in operation during long periods of use.

Another object of the invention is to provide husk ripping means which is effective with both small and large ears of corn.

Other objects of the invention will be evident from the following description of a preferred embodiment as shown in the accompanying drawing.

In the drawing:

Fig. 1 is a vertical sectional elevation of a corn husker embodying my invention, the plane of the view being indicated by the line 1—1 in Fig. 2.

Fig. 2 is a fragmentary plan view of the corn husker shown in Fig. 1.

Fig. 3 is a fragmentary plan view of the lower set of ripping discs with the parts immediately above such discs partially broken away to illustrate the construction more clearly. The view is indicated by the line 3—3 in Fig. 1.

Fig. 4 is a vertical section through the axes of the ripping discs, taken in the plane of the line 4—4 in Fig. 1.

The present invention is preferably embodied in a corn husker in which the ears of corn are placed by an operator on a conveyor with their butts toward a side of the husker. In the conveyor, the ears of corn are first carried past butting means for severing the butts from the ears of corn, and then past husk ripping means for ripping and tearing loose the husks from the ears of corn so as to provide projecting husk portions. The conveyor then delivers the ears of corn to the husking means for the husking operation.

Preferably, the corn husker accommodates two parallel rows of corn which are subjected to the various operations at the same time. However, as the pertinent structure of the parts relating to the instant invention is identical for both rows of corn, such structure is illustrated and described with reference to only one of such rows.

The corn husker includes a frame 10 (Figs. 1 and 2) on which the various elements of the corn husker and the driving means therefor are mounted. The conveyor for carrying the ears of corn past the butting and husk ripping means is indicated generally at 11 and comprises a series of spaced apart transverse flights 12 which extend across the machine and are supported at their ends by similar parallel chains 13, only one of which is shown. Each chain 13 is trained about respective end sprockets 14 (only the rear sprocket 14 being shown) which are suitably journalled on the frame so that the upper run of the conveyor 11 extends substantially horizontally over a plate or table 16 suitably mounted on the frame.

The rear sprocket 14 for each chain is secured on a transverse drive shaft 15 which may be driven by suitable drive connections from a source of power, to cause the flights 12 of the upper run of the conveyor to travel in the direction of the arrow in Fig. 1. The ears of corn in each row are placed between the flights 12 with their butt ends toward the adjacent side of the husker and are rolled or carried by the flights 12 over the table 16.

As the ears of corn move along the table 16 (Figs. 1 and 2) they are positioned for the butting operation by conventional mechanism including a presser arm 20 pivotally mounted at 18 on the frame 10 and carrying a pair of rollers 19 for floating engagement with the ears of corn. The rollers 19 press the ears of corn against an ear mover gear 21, which may be of the type disclosed in my co-pending application, Serial No. 166,990, filed October 2, 1937. The gear 21 operates in a conventional manner to move each ear of corn laterally of the conveyor to engage the butt end of the ear with a gauge 22, which also may be of conventional construction and serves to position the ear of corn with respect to a pair of converging butt severing knives 23 (Fig. 1) past which the ears are carried by the flights 12 of the conveyor. As the ears of corn are moved into engagement with the butt severing knives 23, a spring-urged presser arm 24 mounted on the arm 20 serves to hold the ears in place during the butt severing operation.

After the butt severing operation, the ears of corn are carried by the conveyor between respective upper and lower sets of husk ripping means indicated generally at 26 and 27, from which they are delivered to any suitable form of husking rolls.

The husk ripping means of my invention are constructed to promote long and efficient operation and for this purpose they are made self-cleaning so that they do not become clogged because of repeated operation on the ears of corn. In addition, the ripping means are constructed and mounted in the machine to operate effectively with both small and large ears of corn and for this purpose the upper set of ripping discs are mounted for floating engagement with the ears of corn, the depth of the cut being controlled by guard means which also act to strip the ripping discs and remove any adhering corn husks or silks therefrom.

Preferably, both the upper and lower sets of ripping means are provided in the form of toothed ripping discs which are power driven in opposite directions so that their adjacent portions travel in the same direction and opposite to the direction of the travel of the ears of corn.

The upper ripping means 26 comprises a pair of spaced apart ripping discs 31 (Figs. 1, 2 and 4) secured at the ends of a shaft 32 which is formed integrally with one of the discs. The shaft 32 is journalled in a boss 33 of a horizontally disposed arm 34, which at its rearward end, has a boss 36 pivotally engaged on a shaft 37 which is suitably journalled on the frame. The ripping discs 31 are driven from a sprocket 38 on the shaft 37 by a chain 39, and a sprocket 40 which may be formed integrally with one of the discs 31. The shaft 37 carries a sprocket 41 which is driven through a chain 42 from a sprocket 43 on the drive shaft 15 (Fig. 2). Each ripping disc 31 is provided with a plurality of teeth as seen most clearly in Fig. 1, which are preferably equally spaced apart and driven to travel at their lowest point in a direction opposite to the travel of the conveyor flights 12 for the ears of corn.

To control the depth of cut of the ripping discs, guide means are associated therewith for engagement with the ears of corn, such guide means also being constructed to serve as a stripper for removing loose pieces of husk and silk from the ripping discs. For this purpose, a slotted stripper and guide plate 46 (Figs. 1 and 2) of generally arcuate contour is pivoted by a pin 47 in a boss 48 of the arm 34 and extends outwardly beneath the arm with its convex surface facing downwardly and with the ripping discs 31 projecting through the slots in the plate for engagement with the ears of corn. To control the depth of cut of the ripping discs, an adjustable connection is provided between the guide and stripper plate and the supporting arm therefor, and for this purpose a central tapped boss 49 is provided in the plate 46 adjacent its right hand end as seen in Fig. 1, to receive a bolt 51 which extends upwardly from the boss 49 between a pair of spaced ears 52 (Figs. 1 and 2) projecting outwardly from the boss 33. The bolt 51 is secured in place with respect to the ears 52 by a pair of nuts 53 threaded on the bolt and engaging the opposite sides of the ears 52. As seen in Fig. 4, the slots in the plate 46 and the ripping discs 31 are aligned with a pair of spaced notches 54 in each flight 12 to enable engagement of the ripping discs with small ears of corn. Preferably the sides of the slots in the plate 46 may be defined at the bottom by respective ribs 56 which may move in and out of the notches 54 in accordance with size of the ear of corn which is in active position.

From the above description, it is seen that the upper ripping discs are mounted for floating engagement with the ears of corn and include means for controlling the depth of cut of the ripping discs as well as for cleaning the ripping discs by stripping any loose shreds or husks or loose silk from the teeth as they withdraw through the close fitting slots of the guide and stripper plate.

The lower ripping means 27 also preferably includes ripping discs similar to those described above and which have stripping means to effect cleaning thereof. The lower ripping discs 61 (Figs. 1, 3 and 4) are mounted in spaced apart relation with their shaft 62 (Fig. 4) journalled in a boss 63 of an arm 64 (Fig. 3), which has a boss 66 pivotally engaged on the shaft 15.

As seen in Fig. 4, discs 61 project upwardly through a pair of aligned close fitting slots in a plate 68 which is mounted on the frame to form an extension of the table 16. The extent to which the discs project above the plate 68 is controlled by means of a stud 71 (Figs. 1 and 3) secured at its upper end in the table 16 and extending downwardly between a pair of spaced ears 72 on the boss 63. The stud 71 is threaded at its lower end to receive an adjusting nut 73, and a spring 74 is mounted on the stud 71 between the plate 68 and the ears 72 to maintain the adjusted position of the arm 64 and the ripping discs 61 as determined by the adjustment of the nut 73.

The lower ripping discs 61 are driven by means of a gear 76 formed integrally with one of the discs and meshing with a gear 77 on the shaft 15 so that the discs 61 are driven in a clockwise direction as viewed in Fig. 1.

Both sets of the ripping discs are therefore driven in synchronism with each other and in synchronism with the operation of the conveyor which carries the ears of corn between the ripping discs. Preferably, the timing is such that the respective teeth of the ripping discs simultaneously engage an ear of corn between a pair of adjacent flights 12 of the conveyor. In this manner, the ears of corn will not turn in passing between the ripping discs. As the teeth of the ripping discs are traveling in the opposite direction to the ears of corn, they serve to effectively shred and tear away portions of the husks which will project and can be gripped by the husking means. Because each ripping disc is provided with stripping means formed by the plates 46 and 68 respectively, the ripping means are self-cleaning and can be operated over a long period of time without becoming foul or clogged.

To summarize the operation of the corn husker, the ears of corn are placed by the operator with their butt ends toward the outside of the husker between the flights of the conveyor 11. The conveyor serves to carry the ears of corn past the positioning means including the presser arm 20 and the gauge 22 which determine feeding of the corn in proper position to the butting knives 23.

After the butting operation, the ears of corn are carried between the upper and lower ripping discs, the teeth of which simultaneously engage each ear of corn at spaced apart points to tear loose portions of the husk for engagement with the husking means. Any loose pieces of husk or silk which may cling to the ripping discs are cleaned from the teeth of the ripping discs as they recede through the stripping means formed by the respective plates 46 and 68 associated therewith.

After the husk ripping operation, the conveyor carries the ears of corn downwardly to respective sets of husking means of any suitable construction where the husks and silk are stripped from the ear of corn, the husked ears being subsequently ejected from the machine.

While I have shown and described my invention in connection with a preferred embodiment thereof, it is to be understood that the invention can be embodied in other forms. My invention, therefore, should be limited only by the scope of the claims appended hereto.

I claim:

1. In a corn husker, an apertured plate, a conveyor for moving ears of corn over said plate, ripping means including teeth projecting through an aperture in said plate, and means for moving said teeth in a direction opposite to the movement of the ears of corn for ripping engagement with the husks thereof, the walls of said plate defining said aperture being spaced closely adjacent said teeth to effect cleaning of said teeth after engagement thereof with each ear of corn.

2. In a corn husker, a conveyor for moving ears of corn along a path, a rotatable toothed husk ripper mounted adjacent said path for engagement with ears of corn entrained with said conveyor and operable about an axis parallel to the axes of the ears of corn, and means for controlling the depth of cut of said ripper and having edges in closely spaced relation to said ripper to effect cleaning thereof, said rotatable husk ripper being relatively movable with respect to the controlling means.

3. In a corn husker, a frame, a conveyor movable on said frame to carry ears of corn through a path, an arm pivotally mounted on said frame and extending over said path, a husk ripper journalled in said arm and carried thereby for floating engagement with ears of corn entrained with said conveyor, and means for rotating said ripper about an axis parallel to the axes of the ears of corn including a drive element mounted on said frame in axial alignment with the pivotal axis of said arm.

4. In a corn husker, a frame, a conveyor movable on said frame to carry ears of corn along a path, an arm pivotally mounted on said frame and extending over said path, a plurality of toothed husk ripper discs rotatably carried by said arm for floating engagement with ears of corn entrained with said conveyor, means for rotating said discs about an axis parallel to the axes of the ears of corn, and guide means on said arm engageable with ears of corn for controlling the depth of cut of said discs.

5. In a corn husker, a rotatable husk ripper for engagement with an ear of corn, and a guide stationary member associated with said ripper and provided with a slot through which said ripper projects, said guide member engaging the ear of corn for controlling the depth of cut of said ripper and cooperating therewith for effecting cleaning of said ripper after each engagement thereof with an ear of corn.

6. In a corn husker, an apertured plate, a conveyor comprising spaced bars for moving ears of corn in transverse position along a path over said plate, a toothed husk ripping disc projecting upwardly through said plate into said path, another toothed husk ripping disc mounted in vertical alignment with said first named disc for floating engagement with ears of corn entrained with said conveyor, and means for rotating said discs in opposite directions about an axis parallel to the axes of ears of corn and in a timed relation whereby the teeth thereof when adjacent move in the opposite direction to an ear of corn and engage an ear of corn simultaneously.

7. In a corn husker, an apertured plate, a conveyor comprising spaced bars for moving ears of corn in transverse position along a path over said plate, opposed ripping discs mounted above and below said path for engagement with ears of corn moving therealong, each said disc having circumferentially spaced ripping teeth, and means for rotating said discs in opposite directions about an axis parallel to the axes of ears of corn and in a timed relation whereby the teeth thereof when adjacent move in the opposite direction to an ear of corn and engage an ear of corn simultaneously.

8. In a corn husker, a conveyor for moving ears of corn along a path, ripping means including an apertured gauge plate mounted for engagement with said ears and ripping teeth projecting through said plate, means for moving said teeth in a direction opposite to the movement of the ears of corn for ripping engagement with the husks thereof, and means for effecting relative adjustment between said teeth and plate to determine the depth of said ripping engagement.

9. In a corn husker, a conveyor having a series of pusher bars for moving ears of corn in transverse position along a path, a rotatable toothed husk ripper mounted adjacent said path for engagement with ears of corn being advanced by said pusher bars, means for rotating said ripper in a direction to cause its ear engaging teeth to move counter to the direction of advance of the ears, and means associated with said ripper and fixed against rotation therewith for engaging the ears of corn to automatically gauge the depth of cut of said ripper.

10. In a corn husker, a frame, a conveyor movable on said frame to carry ears of corn along a path, an arm pivotally mounted on said frame and extending over said path, a guide plate mounted on said arm and extending over said path, a plurality of toothed husk ripper disks rotatably carried by said arm, said guide plate being adapted to engage the ears of corn for controlling the depth of ripping engagement of the ripper disks with the ears of corn entrained with said conveyor, and means for driving said disks.

11. In a corn husker, a conveyor having a series of pusher bars for moving ears of corn in transverse position along a path, a rotatable toothed husk ripper mounted adjacent said path for floating engagement with ears of corn being advanced by said bars, means for rotating said ripper in a direction to cause its ear engaging teeth to move counter to the direction of advance of the ears, means associated with said ripper for floating movement therewith and fixed against rotation therewith for engaging the ears of corn to automatically gauge the depth of cut of said ripper, and means for relatively adjusting said disk and ripper to vary the depth of cut of said ripper.

12. In a corn husker, a pair of rotatable toothed ripper disks mounted on spaced parallel axes, means for pushing an ear of corn in transverse position between said disks into ripping engagement therewith, means for driving said disks in opposite directions to cause their ear engaging teeth to move counter to the direction of movement of the ears, and means associated with one of said disks and fixed against rotation therewith for engagement with said ear of corn to control the depth of cut of its associated disk with respect to said ear of corn.

13. In a corn husker, a conveyor for moving ears of corn along a path, a rotatable husk ripper mounted adjacent said path for engagement with ears of corn being advanced by said conveyor, and a gauge shoe associated with said ripper for engagement with said ears to control the depth of cut of said ripper, said gauge shoe being mounted for cooperation with said ripper to strip adhering silks and husks therefrom.

CHARLES E. KERR.